(12) United States Patent
Sallee et al.

(10) Patent No.: US 11,754,307 B2
(45) Date of Patent: Sep. 12, 2023

(54) SYSTEM AND METHOD FOR HEATING AND COOLING SYSTEM MAINTENANCE

(71) Applicant: Motili, Inc., Denver, CO (US)

(72) Inventors: Matthew Sallee, Denver, CO (US); Jeffrey Wilkins, Boulder, CO (US)

(73) Assignee: Motili, Inc., Denver, CO (US)

( * ) Notice: Subject to any disclaimer, the term of this patent is extended or adjusted under 35 U.S.C. 154(b) by 541 days.

(21) Appl. No.: 16/575,670

(22) Filed: Sep. 19, 2019

(65) Prior Publication Data

US 2021/0088249 A1  Mar. 25, 2021

(51) Int. Cl.
| | | |
|---|---|---|
| G06F 11/30 | (2006.01) | |
| F24F 11/58 | (2018.01) | |
| G06Q 10/20 | (2023.01) | |
| F24F 11/30 | (2018.01) | |

(52) U.S. Cl.
CPC .............. *F24F 11/58* (2018.01); *F24F 11/30* (2018.01); *G06Q 10/20* (2013.01)

(58) Field of Classification Search
CPC ................................................ F24F 11/581
See application file for complete search history.

(56) References Cited

FOREIGN PATENT DOCUMENTS

WO    WO-2014144446 A1 * 9/2014 ......... F24D 19/1084

* cited by examiner

*Primary Examiner* — Phuong Huynh
(74) *Attorney, Agent, or Firm* — K&L Gates LLP

(57) ABSTRACT

An HVAC system is provided. Embodiments of the present disclosure generally relate to HVAC systems in communication with a test engine configured to schedule maintenance and service calls. In one embodiment the test engine utilizes the ambient temperature and temperature setpoint to establish a maintenance schedule.

5 Claims, 5 Drawing Sheets

Predictive HVAC Service Call - System Overview

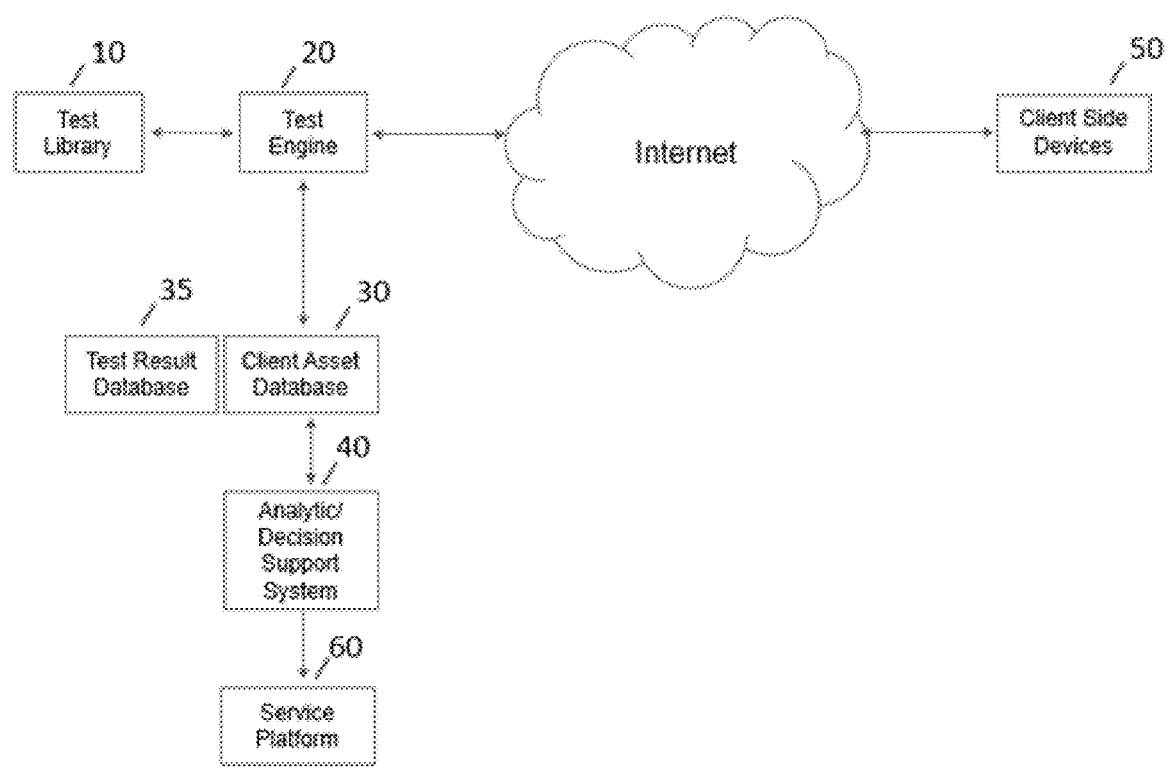
FIG. 1 - Predictive HVAC Service Call - System Overview

Expected System Response – Typical time required to achieve setpoint

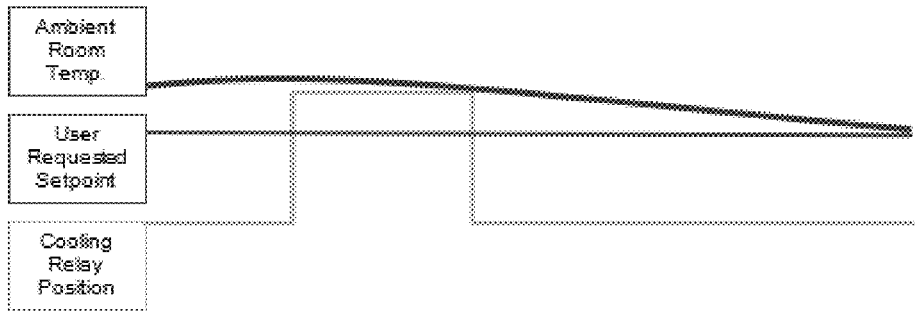

A properly functioning HVAC system will be able to achieve a set-point within a reasonable amount of time. This amount of time may change with variances in ambient temperature and humidity.

Problem Response – Too slow to achieve setpoint

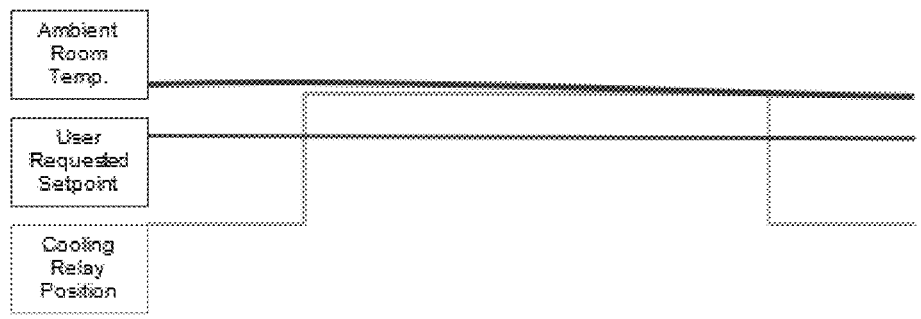

Extreme changes in a systems ability to achieve setpoint can be identified in a variety of fashions. These extreme variances in time to achieve a request setpoint indicate an issue with the system, and a service call should be generated.

FIG. 2 - Example Expected and Problematic Responses

Device Relative to Digital Twin – Performance Over Time
Last Year Repsonse
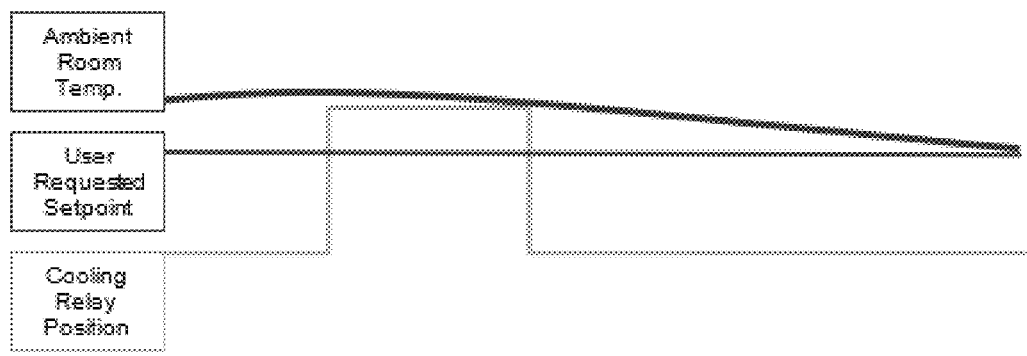
This Year Response
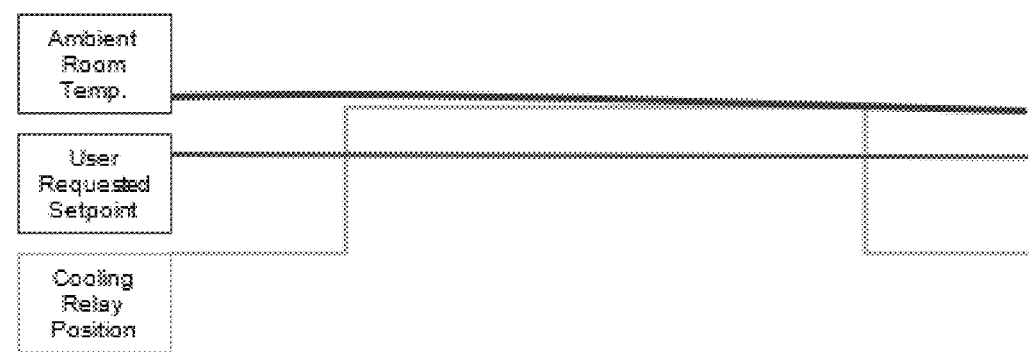
By comparing system ability to digital twin, performance degradation over time can be measured and responded to proactively, prior to resident noticing issue.
FIG. 3 - Performance Over Time

MACI Data Inclusion

Further, if the system is unable to reach setpoint in a reasonable period of time, and we have collected Asset Data, we can provide a recommendation on the type of service that is necessary.

MACI 'Replace Now':

Recommend System Replacement, provide client turn-key replacement price for approval. Quote includes system performance analysis, age and condition, energy savings on new system, good / better / best SEER recommendation, and turn-key price. Automatically. If approved, dispatch technican to replace system.

MACI 'Replace Soon':

Recommend system service call, likely a major component, provide guidance on typical major repair and replacement costs to client. Dispatch technican to diagnose and repair or replace system.

MACI 'OK':

Recommend system service call, likely preventative maintenance. Clean coil, clean condesate lines, check pressures, change filter. Recommend course of action via quote. If apparoved dispatch technican to clean system.

MACI 'New':

Recommend system warranty check to ensure system is properly installed. Recommend service visit, and no initial charge to client. Dispatch technican to inspect system.

FIG. 4 - Example Recommendations

Device Relative to Peers – Apartment Complex

| 401 | 402 | 403 | 404 | 405 | 406 | 407 | 408 | 409 |
|-----|-----|-----|-----|-----|-----|-----|-----|-----|
| 301 | 302 | 303 | 304 | 305 | 306 | 307 | 308 | 309 |
| 201 | 202 | 203 | 204 | 205 | 206 | 207 | 208 | 209 |
| 101 | 102 | 103 | 104 | 105 | 106 | 107 | 108 | 109 |

A system can also be evaluated against its peers, both in multi-family environments, and in buildings and single family communities that have large installations of smart home devices.

Remote system tests could be performed, cycling each system to evaluate the time required for each to achieve the requested setpoint.

The statistical outliers could then be identified, and proactive service calls recommended.

FIG. 5 - Sample Multi-Unit Reporting

SYSTEM AND METHOD FOR HEATING AND COOLING SYSTEM MAINTENANCE

BACKGROUND

This section is intended to introduce the reader to various aspects of the art that may be related to various aspects of the presently described embodiments—to help facilitate a better understanding of various aspects of the present embodiments. Accordingly, it should be understood that these statements are to be read in this light, and not as admissions of prior art.

Heating, ventilation, and air conditioning (HVAC) systems are generally used to adjust the temperature and/or humidity of the air within a structure. HVAC service technicians typically first learn of problems with a client's HVAC system when the client contacts the service technician to describe the problem. As the use of the heating and/or cooling features of an HVAC system are generally seasonal, many clients in a particular geographical area may first use the heating and/or cooling feature of their HVAC systems on approximately the same day. This can lead to a large number of service requests being received in response the first heat wave and/or cold snap of the season. The number of service requests may significantly spike during extreme temperature events as well.

The HVAC industry is generally understaffed with licensed HVAC service technicians. As a result, during periods of higher than usual demand, clients may be forced to wait for excessive periods of time for a service technician while their HVAC system is generally not operational.

To address this shortcoming, HVAC service technicians and manufacturers have explored the use of monitoring techniques using smart thermostats and sensors to detect system problems before a client reports them. In residential HVAC systems, this is often limited to simple alerts such as, for example, the ambient temperature reaching an upper or lower threshold, or the HVAC system requiring an extended amount of time to bring the ambient temperature (sometimes colloquially called "room temperature") to a new temperature setpoint. Service providers have used passive remote monitoring to help HVAC servicers identify systems exhibiting signs of failure.

Several problems exist with this passive monitoring approach. First, prior to the first heat wave/cold snap, HVAC systems are often inactive. In some cases, the HVAC systems are turned off. In other cases, mild outdoor air temperatures may result in mild ambient temperatures and may obviate the need for cooling or heating. As a result, no alerts will be generated. Second, even if the system is operating, the workloads used to test the system are set by the homeowner or tenant. This workload variability limits the ability to make remote inferences regarding system condition.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure generally relate to a heating, ventilation, or air conditioning (HVAC) systems adapted to communicate with a wireless thermostat such as, for example, a Wi-Fi or cellular enabled thermostat. In some embodiments, the HVAC system may communicate diagnostic information to a wireless thermostat. In some embodiments, the wireless thermostat may be configured to receive instructions from a service provider and communicate those instructions to the HVAC system. In some embodiments, the present invention uses the two-way capabilities of wireless or smart thermostats to initiate and/or run a standardized set of experiments remotely without waiting for a heat wave or for the homeowner/tenant to adjust their setpoints.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

FIG. 1 illustrates schematically an overview of the disclosed system in accordance with an embodiment of the present disclosure;

FIG. 2 illustrates an expected system response and a problematic system response in accordance with an embodiment of the present disclosure;

FIG. 3 illustrates system responses elicited from the same system over time in accordance with an embodiment of the present disclosure;

FIG. 4 illustrates a set of potential service call recommendations based on collected asset data in accordance with an embodiment of the present disclosure;

FIG. 5 illustrates a potential application of the disclosed system incorporating multiple HVAC systems in accordance with an embodiment of the present disclosure.

DETAILED DESCRIPTION OF SPECIFIC EMBODIMENTS

One or more specific embodiments of the present disclosure will be described below. In an effort to provide a concise description of these embodiments, all features of an actual implementation may not be described. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements.

Modern HVAC systems may be connected to wireless and/or smart thermostats that allow a resident to control a setpoint of the HVAC system remotely or to pre-program an ambient temperature setpoint. The smart thermostat is typically able to send instructions to the HVAC unit directing the HVAC unit to turn on (e.g., activate a cooling relay) or turn off based on ambient temperature, the desired setpoint, and/or the change in ambient temperature as the HVAC unit runs for a given period of time. In some embodiments, the smart thermostat may determine the expected response to the ambient temperature and modulate the amount of runtime of an HVAC system in order to achieve the desired ambient temperature without overshooting the setpoint.

In some embodiments, a smart thermostat may be able to transmit information related to the performance of an HVAC system to a remotely located HVAC service provider or technician using a local network. The transmitted information may be recorded and/or analyzed in order to determine the overall health of the HVAC system. If a problem is detected, a repair or replacement may be recommended based on the information transmitted by the smart thermostat.

In some embodiments of the present disclosure, a remotely located service provider is able to transmit test protocol instructions to a smart thermostat. The smart thermostat is then able to instruct the HVAC system to take certain actions which may be used to determine operational characteristics and/or diagnose issues with the HVAC system that may be undetectable by the resident. These test protocols may be run by the smart thermostat and HVAC system without any input from the occupant of a particular building. Additionally, in some embodiments, a test protocol may be run while the occupant is away, thereby avoiding any disruption to the occupant.

In some embodiments, an HVAC system and/or smart thermostat comprises an occupancy sensor configured to determine whether an occupant is in a climate-controlled structure. If the occupancy sensor data shows that a structure is vacant, the disclosed system may begin a diagnostic protocol. In some embodiments, a smart thermostat may develop a statistical model of an occupant's behavior patterns and be able to anticipate when the occupant is likely to be away from the building for a longer period of time such as, for example, when an occupant goes to work. This may prevent the disclosed system from initiating a test protocol when the occupant has left the building for a short period of time such as, for example, to run a quick errand.

In some embodiments, the disclosed system communicates with the occupancy sensor to determine when the structure is vacant and then sends an instruction message directing the thermostat to adjust the setpoint. Once the set point is adjusted, the HVAC system and its components may be powered on and monitored in order to determine the health of the HVAC system and its components as the HVAC system adjusts the ambient temperature to reach the new setpoint.

In some embodiments, the system may monitor the amount of time it takes the HVAC system to heat and/or cool the structure to change the ambient temperature to satisfy the remotely set setpoint. Some embodiments may also determine the rate of temperature change on a degree and/or time basis.

The disclosed systems may be used to determine the health of a single HVAC system over time such as, for example, the HVAC system in a single-family home. By periodically querying the health of the same HVAC system, any decrease in performance may be identified even if the occupant would not have noticed the performance loss. For example, if an HVAC unit requires a greater amount of run time to adjust the ambient temperature by a predetermined amount than the unit previously required, a loss of performance may be indicated. In this example, the occupant may never notice the loss of performance as the ambient temperature would still reach the setpoint, only not as quickly.

The disclosed systems may also be applied to multiple HVAC systems in order to group, categorize, and/or prioritize service calls and monitor the health of multiple HVAC units over time. In one non-limiting example, all of the HVAC units at a large apartment complex may be periodically queried in order to monitor the health of the units over time. In such an example, service technicians may prioritize units that require service to function over units that are suffering from a loss of performance but are still able to maintain a setpoint temperature. Additionally, a service technician may be able to travel to the apartment location to service multiple units that require attention prior to a heat wave or cold front impacting a given area. In another example, if an HVAC unit requires immediate repair, a service technician may take note of units that are suffering from a loss of performance and service those units in addition to servicing the unit that requires immediate attention as part of the same on-site visit.

In some embodiments, statistical cohort groups may be created to benchmark the performance of similar HVAC systems. HVAC systems may be considered similar based on, for example, brand, tonnage, SEER rating, or the like. In some embodiments, statistical cohort groups may additionally include location, weather and/or the size of the space being cooled.

By employing certain analytical methods, outliers from the average of a given cohort may be identified. In some embodiments, the performance of a particular unit may be compared with the performance of that same unit at a prior date. In some embodiments, an analysis may include mass screenings of units to prioritize the HVAC units most in need of attention before heating and cooling season. A service provider may then be able to dispatch a service technician to service the prioritized units to identify and address any issues causing poor performance before a large influx of service calls are expected.

Turning to the figures, FIG. 1 illustrates an example embodiment of the disclosed system. In some exemplary embodiments, system 100 comprises a test engine 20 that is configured to communicate with a client-side device 50, such a smart thermostat and/or HVAC system. Test engine 20 may send the client-side device 50 a test protocol in order to determine the health of a connected HVAC system. A test library 10 may contain multiple test protocols that may be used under different conditions and transmit the test protocols to the test engine 20. Once the test engine 20 instructs a client-side device 50 to run a test protocol, the test engine 20 may receive the test results.

System 100 may also comprise a client asset database 30 configured to contain information related to the client-side device and/or components of a connected HVAC system such as, for example, the brand, model, seer rating, of the client-side device and/or HVAC system. System 100 may also comprise a test result data base 35 configured to store the test results of a given test protocol. Test result database 35 may be used to store test results related to the same HVAC system over time to provide greater context for a given set of test results.

In an exemplary embodiment, the test results may be analyzed in conjunction with the client asset information by an analytic/decision support system ("ADSS") 40. The ADSS 40 may be configured to analyze the test protocol, test results, client asset information, and other information such as the weather patterns around the HVAC system, previous test data, previous services performed on the HVAC system, and the like in order to determine the health of the HVAC system.

In some embodiments, test library 10 contains the details of multiple potential diagnostic protocols that may be run using a given HVAC system. In some embodiments, one or more of the test protocols leverage the existing capabilities of a smart thermostat such as, for example, the ability to remotely command an HVAC system to run. In this general test, if an HVAC system cannot be remotely accessed, the HVAC system may be identified as a non-functioning system and scheduled for service.

In another non-limiting example test protocol, the test engine 20 may instruct the client-side smart thermostat to adjust the setpoint a certain amount above or below the ambient temperature. The client-side device 50 may report the time required for the ambient temperature to reach the new setpoint. If the ambient temperature fails to reach the setpoint within a pre-determined amount of time, a system issue may be identified, and the system may be scheduled for service. In some embodiments, the test engine 20 may select additional test protocols form the test library 10 in order to further diagnose the identified system issue and provide the service technician with additional information prior to scheduling a service call. In some embodiments, the outdoor temperature, size of the climate-controlled space, age of the HVAC system and/or age of the structure may be taken into account when determining the test setpoint and/or pre-determined amount of time allowed to reach the test setpoint.

In another non-limiting example, the setpoint and ambient temperature may be periodically and passively monitored. If the ambient temperature deviates from the setpoint by more than a pre-determined amount, the test engine 20 may implement an active test protocol selected from the test library 10 in order to diagnose the potential system issue.

It will be appreciated that the test protocols contained in test library 10 may include, in addition to ambient temperature, setpoint, and run-time, a variety of component instructions and sensor data from sensors embedded in the HVAC system. Such sensors may include, for example, voltage sensors, RPM sensors, pressure sensors, temperature sensors, relay sensors, and/or PLC controllers. The client-side device 50 may be configured to transmit some or all of the sensor data to the test engine 20 and/or test result database. In some embodiments, retrofit and/or additional sensor kits may be installed on existing HVAC systems to enable more sophisticated remote diagnostic testing.

In some embodiments, the client-side device 50 may incorporate a sensor kit retrofitted to an HVAC system. It will be appreciated that many home automation devices, protocols and topologies may be leveraged with the disclosed systems including, without limitation, those based on X-10, Universal Powerline Bus (UPB), Insteon, Z-Wave, Zigbee, Wi-Fi, If-This-Then-That (IFTTT), Bluetooth, and/or Thread.

In some embodiments, test engine 20 is configured to retrieve the protocol details from the test library 10 and details of the HVAC system to be tested from the client asset database 30. The test engine 20 may administer a remote testing protocol and receive the resulting test data from the client-side device 50. The test data may be stored in the test result database 35. In some embodiments, test engine 20 communicates with the client-side device 50 using a TCP/IP protocol. In some embodiments, multiple client-side devices 50 within a given building or facility are interrogated serially by test engine 20.

In some embodiments, client-side device 50 receives test protocol instructions from the test engine 20. Client-side device 50 may comprise a smart thermostat such as, for example, those manufactured by Nest, EcoBee, Resideo or the like. In some embodiments, the client-side device 50 may further comprise a communications hub connected to the Internet via Wi-fi or a cellular modem although in some embodiments, a smart thermostat or other client-side device 50 may be connected to the internet without the use of a hub. In some embodiments, client-side device 50 is embedded or otherwise incorporated into an HVAC system itself. In such embodiments, there may be no need for a smart thermostat as the HVAC system may be in data communication with the test engine 20.

Upon execution of a test protocol, data and/or results may be collected by the test engine 20 and/or test result database 35. In some embodiments, the results are transmitted by the client-side device 50, to the test engine 20 as raw time series. In one example, set point test results may be recorded as a time series of the ambient temperature and/or system run-time. In some embodiments, the client-side device 50 may interpret the time series data prior to transmitting any data and then relay only metadata to the test engine 20. In one example, an ambient temperature time series data may be classified as "pass" or "fail." In such embodiments, only the results of the test and/or other diagnostically useful information may be transmitted by the client-side device or to a service operator without transmitting information directly related to a particular HVAC system, structure, or the occupants of a structure.

In some embodiments, the client asset database 30, contains details related to the HVAC systems to be tested such as, for example, the client name, client address, HVAC system ID, HVAC system brand name, model number, serial number and/or date of manufacture. In some embodiments, the client asset database contains client-side devices 50 details such as, for example, the type or smart thermostat, embedded sensors, retrofit sensors, manufacturer, device names and/or IP addresses. In some embodiments, derived attributes may also be computed and/or stored in the client asset database 30 for later reference. For example, a Motili Asset Condition Index (MACI) which rates HVAC system health on a scale of 0-100 may be stored. In some embodiments, the MACI index may be stored overtime while other information is deleted or destroyed to better protect personal information and/or the privacy of an occupant, homeowner, user, and/or customer.

In some embodiments, the test results may be stored in a test results database 35. The test results may comprise the test ID of an administered protocol, HVAC system ID, raw time series data, experiment results metadata, compressor data, pressure data, refrigerant data, and/or other test result data. In some embodiments, the HVAC system ID may be used to anonymize the occupant, location of the HVAC system tested, and/or other information that could potentially be used to identify an occupant, homeowner, user, and/or customer. In some embodiments, the client asset database 30 and test result database 35 may be entirely independent systems. In some embodiments, the client asset database 30 and test result database 35 may be housed in the same location, contained on a single server, be in data communication, be separately encrypted, or any combination of the above.

In some embodiments, the ADSS 40, analyzes and classifies the test result data and/or client asset data to generate recommended actions that may be implemented by the service platform 60. In some embodiments, a MACI or other index score may be combined with test results data to determine if a unit should be maintained, repaired, or replaced. For example, if a recent test showed a high MACI score, but the HVAC unit has an identified service issue, the HVAC system may need to be repaired rather than replaced as the unit was recently functioning at a high degree of performance. If the unit has shown steadily decreasing MACI scores over an extended period of time, the HVAC unit may be approaching the end of its lifecycle and the ADSS may be more likely to recommend replacement of the system. If a system shows an acceptable MACI score but the score is not as high as it was previously, the ADSS may recommend the unit be maintained rather than repaired or replaced as the unit is still functioning but could be performing better.

In some embodiments, current or recent experimental results may be compared to a previous test result to as part of the determination of whether to repair or replace a unit. In some embodiments, any classifications and/or determinations made by the ADSS 40, may be recorded in the client asset database 30 and/or test result database 35. In some embodiments, the test engine 10 may administer testing subsequent to a service call to determine if the ADSS properly identified a system issue and made an effective service recommendation. It will be appreciated that many data science and/or machine learning techniques may be used to train and/or refine the classification or analysis performed by the ADSS 40. In some embodiments, once a system issue has been identified, test engine 20 may transmit operating instructions such as, for example, a software update to the HVAC system and/or client-side device 50.

In some embodiments, the service platform 60, is configured to implement the recommendations from the ADSS 40. The service platform 60 may be configured to provide notifications of issues detected and recommended service responses via various channels such as SMS, e-mail, in-app alerts, and/or system-to-system API calls. In some embodiments, the service platform 60 may provide notifications directly to the occupant. In some embodiments, the service platform provides notifications to a manager, operator, and/or service technician.

In some embodiments, the service platform 60 prioritizes service requests so that the most urgent repairs are performed first. In some embodiments, client-level or geographic standard pricing information may be contained in the service platform 60. In such embodiments, quotes and/or service costs may be provided for client approval along with service alerts. In some embodiments, once a client approves a quote, the approved quote may be converted to a work order and automatically dispatched to a service technician. In some embodiments, modifications to the work order made by the service technician may be recorded and used to further train the ADSS. In this manner, misclassifications of service needs made by the ADSS 40 may be noted and reduced over time.

FIG. 2 illustrates an example test protocol and system response. In the exemplary expected system response, the ambient room temperature is initially higher than the user requested setpoint. To bring the ambient temperature to the setpoint, the cooling relay of the HVAC system is activated for a short period of time before being shut off. The ambient temperature begins to drop once the cooling relay is activated and continues to drop even after the cooling relay is turned off. This indicates a degree of lag time between the cooling relay providing cooled air to the room and the cooled air mixing with the ambient air in order to reduce the ambient room temperature measured at the thermostat or thermocouple used to monitor the ambient temperature. After the cooling relay is turned off, the ambient temperature continues to drop until it substantially reaches the user requested setpoint.

In the illustrated problem response, the ambient temperature is above the user requested setpoint. When the cooling relay is activated, the ambient temperature only responds a small amount. Accordingly, the cooling relay is left on for an extended period of time, but the ambient temperature does not drop sufficiently to meet the user desired setpoint. This indicates a system issue that is preventing the HVAC system from cooling the ambient temperature to the user requested setpoint. It will be appreciated that in some embodiments, rather than utilizing a user requested setpoint, the test engine could instruct the client-side device to request a setpoint without user involvement.

In some embodiments, a problematic response may be less dramatic than the problem response illustrated in FIG. 2. For example, in a potential problematic response, the ambient temperature may ultimately be lowered by the HVAC system and reach the requested setpoint, but the cooling relay may need to be activated for a longer period of time than is desirable. This may be an undetectable issue by for the occupant but could be diagnosed by embodiments of the disclosed system.

FIG. 3 illustrates a comparison of test results based previous performance data or a digital twin. As shown, the test results for last year's response show an ambient temperature above the requested setpoint. The cooling relay is activated for a period of time and the ambient temperature is brought down to substantially meet the setpoint temperature. In this year's response, the ambient temperature starts above the requested setpoint, but the ambient temperature is not brought down to meet the requested setpoint despite the cooling relay being activated for an extended period of time. Accordingly, a significant loss of performance related to the same unit can be identified over time.

In some embodiments, a test protocol may be remotely administered to establish a baseline after a system issue has been identified. Once the service technician has performed the recommended service to the HVAC unit, the same test protocol may be administered again in order to determine the efficacy of the maintenance or repair performed by the service technician.

FIG. 4 illustrates potential service recommendations based on a MACI index score. As indicated in FIG. 4, a MACI index score may indicate that a unit should be replaced immediately, replaced soon, that the unit is ok and may only need preventative maintenance, or that a unit is substantially new. In some embodiments, this information may be provided for multiple HVAC units to a manager or service technician to allow a streamlined review of the status of multiple HVAC units on a commercial property or throughout an enterprise.

FIG. 5 shows an example report showing the status of multiple HVAC units in an apartment complex. In some embodiments, multiple HVAC units may be tested in series and the results of the test may be compiled into a report allowing for streamlined visualization and/or understanding of the state of multiple HVAC units at a glance. In some embodiments, problematic HVAC units may be identified based on the average performance of the other HVAC units in the given statistical group. In some embodiments, problematic HVAC units may be identified based on an absolute performance measurement without regard to the performance average of the other associated HVAC units.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system for providing conditioned air to a structure, the system comprising:
    an HVAC system comprising an HVAC component for providing the conditioned air to the structure;
    a thermostat configured to control the HVAC system; and
    a test engine remote from the structure and the HVAC system and connectable in data communication with at least one of the HVAC system or the thermostat;
    wherein at least one of the HVAC system or the thermostat is configurable to receive test protocol instructions from the test engine and implement the test protocol instructions on the HVAC component to determine at least one of operational characteristics or diagnose issues with the HVAC system.

2. The system of claim 1, further comprising a client asset database configured to contain information related to the HVAC component.

3. The system of claim 1, further comprising a decision support system in data communication with the test engine, the decision support system configured to analyze test result information and determine a service recommendation.

4. The system of claim 3, further comprising a service platform in data communication with the decision support system, the service platform configured to receive a service recommendation from the decision support system and schedule a servicing of the HVAC component.

5. The system of claim 1, wherein the thermostat is in data communication with the HVAC component and the test engine and is configured to receive the test protocol instructions from the test engine and implement the test protocol on the HVAC component.

* * * * *